July 29, 1941.　　　　　F. E. WELD　　　　　2,250,924
ELECTRICAL CONTROL SYSTEM
Filed Jan. 2, 1940　　　　3 Sheets-Sheet 1

July 29, 1941.  F. E. WELD  2,250,924
ELECTRICAL CONTROL SYSTEM
Filed Jan. 2, 1940  3 Sheets-Sheet 2

Witness
Paul F. Bryant

Inventor
Foster E. Weld
by his attorneys
Fish Hildreth Cary & Jenney

Patented July 29, 1941

2,250,924

UNITED STATES PATENT OFFICE 2,250,924

ELECTRICAL CONTROL SYSTEM

Foster E. Weld, Newton, Mass., assignor to The Gamewell Company, Newton Upper Falls, Mass., a corporation of Massachusetts Application January 2, 1940, Serial No. 311,984

14 Claims. (Cl. 171—97)

The present invention relates to control systems, and more particularly to systems for controlling individual charges on a set of storage batteries.

My co-pending application, Ser. No. 311,893, filed January 2, 1940, describes an electrical transfer system particularly suitable for battery charge control and involving the use of a set of stepping relays, the operations of which are controlled both by charging time and by battery voltage.

The principal object of the present invention is to provide an improved and simplified transfer system by which the charges on individual batteries may be controlled automatically under normal conditions but with provision for manual control on a selected battery whenever desired.

According to the present invention the system provides for time control of charge through a set of cams which may be constructed to apply charges of predetermined lengths to the individual batteries, subject to automatic cut-off whenever a battery undergoing charge reaches its fully charged condition. As in the system of my co-pending application, provision is made for insuring that the charging circuit can be connected only to one battery at a time, and thus preventing any cross connection or paralleling of batteries either during a transfer period or under any other conditions. The invention also contemplates a manual control which supersedes the automatic control and permits any selected battery to be subjected to charge of any desired duration.

Figure 1:
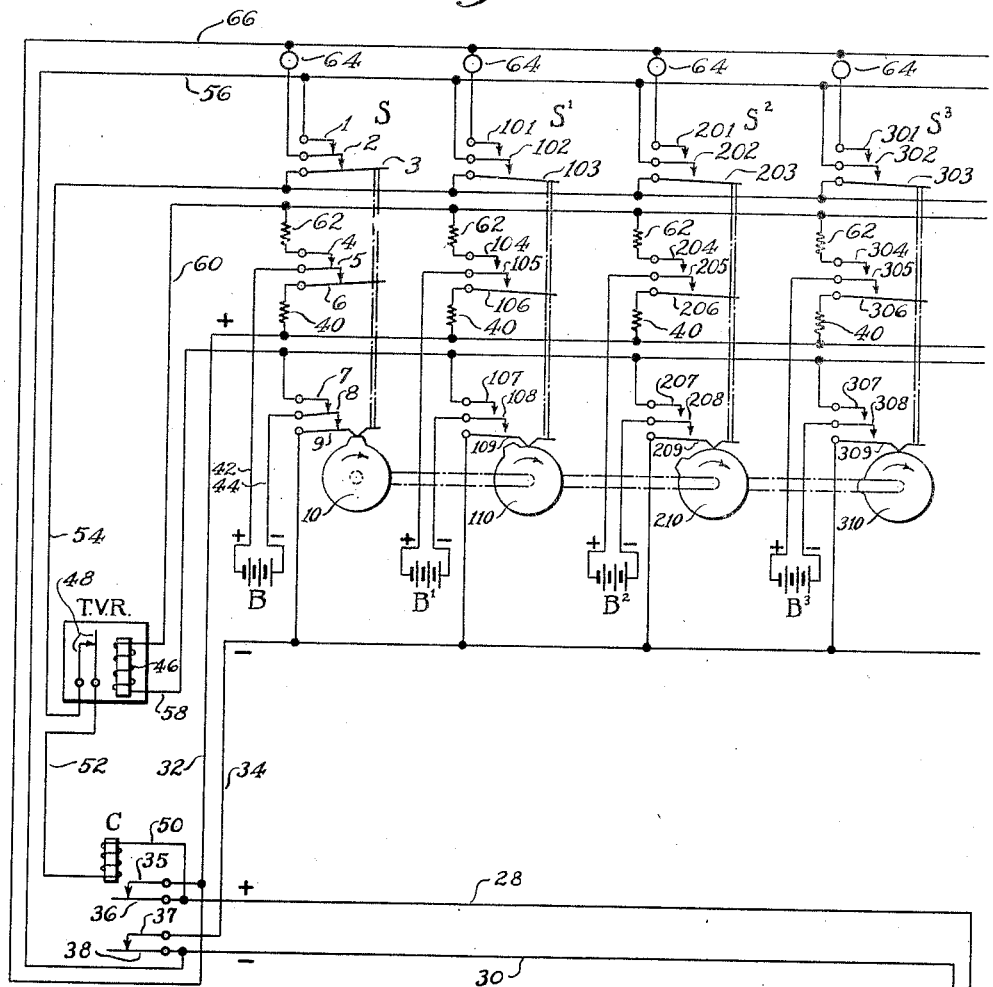
Figure 2:
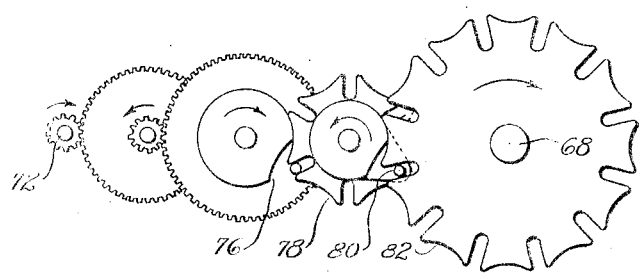
Figure 3:
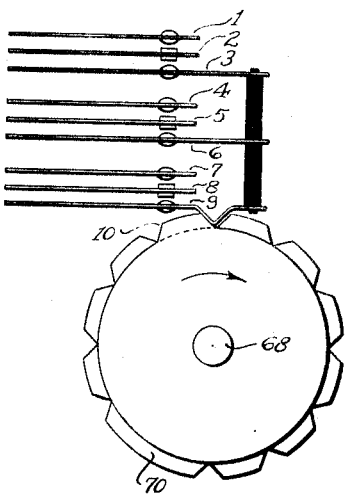
Figure 4:
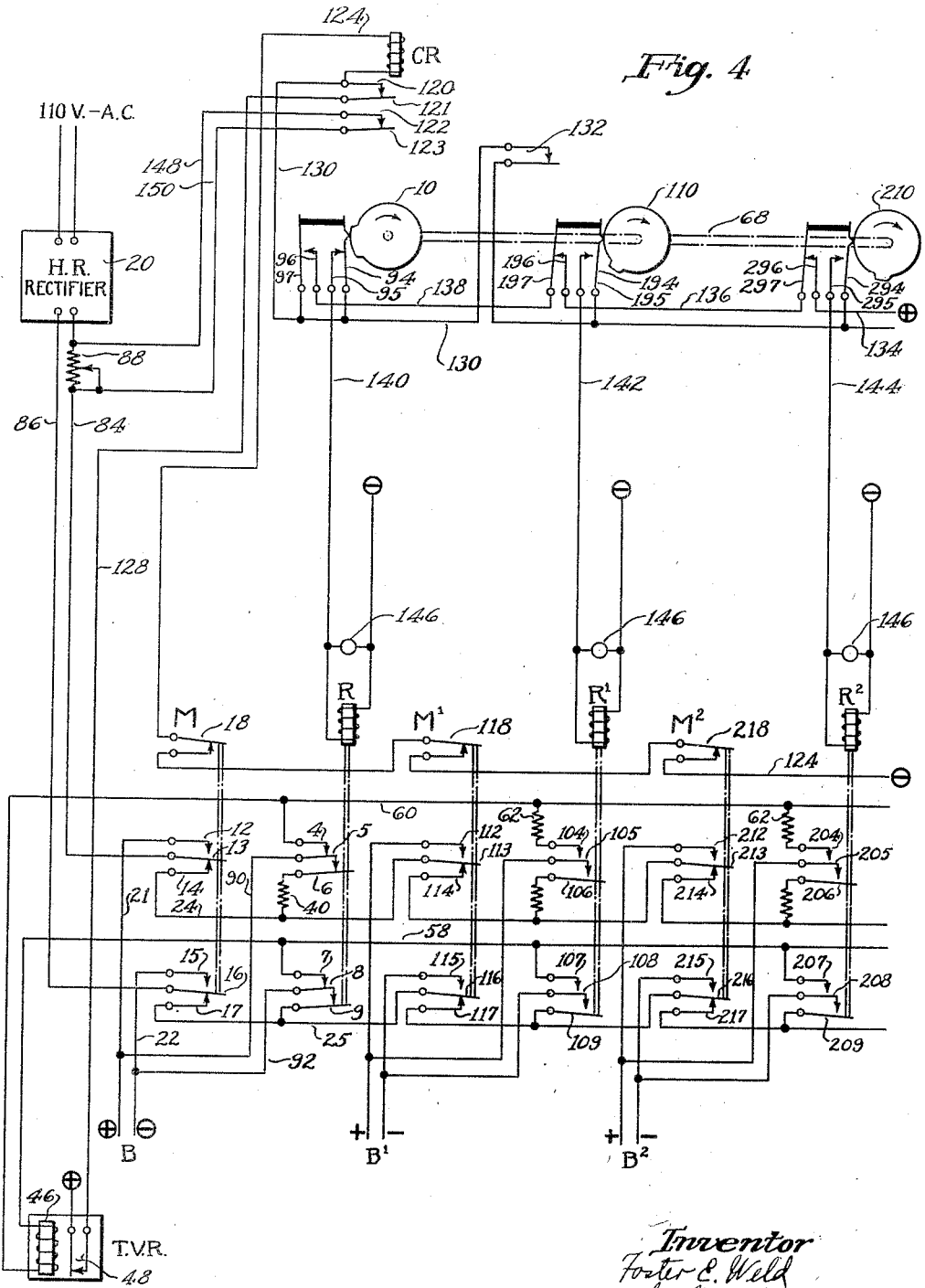

In the accompanying drawings Fig. 1 is a diagram of one embodiment of a battery charging system according to the present invention; Fig. 2 is an elevation of a part of the timing mechanism; Fig. 3 is an elevation of one of the automatic switches; and Fig. 4 is a diagram of the preferred embodiment of the system according to the present invention.

System of Fig. 1

The system illustrated in Fig. 1 is for the charging of a number of batteries whereby a definite charging time is allotted to each battery, subject however to cutoff of charge when the voltage reaches a predetermined value. Four batteries are illustrated at B, B', B² and B³. The charge is under the control of a series of automatic timing switches, one for each battery, designated S, S', S² and S³, and a series of manual switches M, M', M² and M³. Each of the automatic switches has three groups of three contacts each numbered for the switch S from 1 to 9, for S' from 101 to 109, for S² from 201 to 209, and for S³ from 301 to 309. The several switches are identical and a description of the contacts of switch S alone will suffice. The contacts 3, 6 and 9 are movable and are controlled by a timing cam 10. When operated by the cam, contact 3 closes on contact 2 and causes the latter to engage with contact 1. Similarly, the groups 4, 5, 6 and 7, 8, 9 are closed. The other switches are provided with cams designated 110, 210 and 310, respectively. The several cams are driven by mechanism presently to be described, whereby the contacts of one switch are opened prior to closure of the contacts of the next succeeding switch.

The manual switches M, M', etc., comprise two groups of three contacts each. For the switch M these contacts are numbered from 12 to 17. Contacts 13 and 16 are movable, contact 13 being adapted for selective connection to either 12 or 14, and contact 16 being adapted for selective connection to either 15 or 17. The contacts for the other manual switches are designated by reference characters ending in the same numerals.

The direct current terminals of the charger or high-rate rectifier 20 are connected to contacts 13 and 16 of switch M. Contacts 12 and 15 are connected to battery B by wires 21 and 22, respectively. Contact 14 of switch M is connected by a wire 24 with contact 113 of M' and contact 17 is connected by a wire 25 with contact 116 of M'. Contacts 112 and 115 are connected to battery B' in the same manner as the corresponding contacts of switch M are connected to battery B. This same series of connections is carried out through all the manual switches, the lower fixed contact of each group being connected to the movable contact of the next succeeding group and the upper contacts of the groups being connected to the battery terminals. The final contacts 314 and 317 of the last manual switch M³ are connected to positive and negative charging lines 28 and 30, respectively. When the manual switches are down, as shown in Fig. 1, the rectifier terminals are connected through the series of switch contacts to the charging line 28, 30. If switch M is thrown up the rectifier terminals are connected to battery B and this switch takes control regardless of whether the other manual switches are up or down. Similarly, if M' is up while M is down, the charge is applied to battery B'. Thus, the first manual switch in the "up" position controls the charge. Ordinarily reliance is placed on the automatic switches, and the manual switches are left in the "down" position as shown in Fig. 1, these switches being used only when an extra charge must be applied to one of the batteries to take care of an excessive load which has been placed thereon.

The charging lines 28 and 30 are connected, respectively, to positive and negative charging busses 32 and 34 through contacts of a cut-off relay C. The relay contacts are designated at 35 and 36 connected between 28 and 32, and 37 and 38 connected between 30 and 34. The negative bus 34 is connected with the movable switch contacts 9, 109, etc., of the automatic switches, and the positive bus 32 is connected with movable contacts 6, 106, etc. Each of the connections from the positive charging bus to the contacts 6, etc., may include a charge adjusting resistor 40 and these resistors may vary in magnitude if the several batteries are of different voltages or are to be charged at different rates. Contacts 5 and 8 are connected by wires 42 and 44 with the positive and negative terminals of battery B, and the corresponding contacts of the other automatic switches are similarly connected to their batteries.

It will be understood that the system may be used for any number of batteries by connecting additional cam switches similar to S to the busses and by including additional manual switches similar to M in the charging lines. To indicate the adaptability for additional connections, the lines 28, 30 are shown in dash lines after they leave the contacts of M³. The cams 10, 110, etc., are cut to actuate the switches in sequence, so that each switch is closed for a single interval for each revolution of the drive shaft. The cams may be provided with lobes of different lengths to apply different charges to the several batteries. As illustrated, the cams are cut for a system involving more than four batteries, but only four are shown to avoid unnecessary duplication.

The cut-off relay C is under the control of a voltage responsive relay TVR, having a winding 46 and a pair of contacts 48 which are opened when the current through the winding 46 reaches a predetermined value. A connection 50 runs from the positive charging line 28 to one terminal of the winding of relay C, the other terminal of which is connected by a wire 52 with the contacts 48, which in turn are connected to a bus 54. This bus is connected with the contacts 3, 103, etc., of the automatic switches. Contacts 1, 101, etc., of the switches are connected to a bus 56, which connects with the negative charging line 30. Thus, the relay C is energized whenever the contacts 48 are closed and any of the switch contacts ending in numerals 1, 2 and 3 are closed.

One terminal of winding 46 of relay TVR is connected to a control bus 58 which is connected to the contacts 7, 107, etc., of the automatic switches, and the other terminal of the winding 46 is connected to a second control bus 60, which is connected through resistors 62 with the contacts 4, 104, etc., of the automatic switches. The resistors 62 are multipliers for the TVR relay and are ordinarily necessary only when the batteries are of different voltages. Thus, in a fire alarm system the local battery is usually 24 volts and the line batteries are 48 volts, so that a multiplier would be used only for the 24-volt battery.

To indicate the battery undergoing charge, a series of pilot lamps 64 is provided. These are separately connected to the contacts 2, 102, etc., and also to a pilot lamp bus 66 which is connected to the positive charging bus 32.

Under the condition shown in Fig. 1, the first switch S is closed by cam 10. The TVR contacts 48 are closed and the relay C is energized so that the cut-off contacts 35 to 38 are closed. Battery B is thus subjected to charging current. Bearing in mind that the manual switches are down, the charging lines 28 and 30 are energized as if directly connected to the rectifier terminals. The charging circuit for battery B may be traced from the positive charging line 28 through contacts 36, 35, positive charging bus 32, resistor 40, contacts 6, 5, connection 42, through battery B and then through connection 44, contacts 8, 9, negative charging bus 34 and contacts 37, 38 to the negative charging line 30. Winding 46 of the TVR relay is energized by a circuit traced from the positive terminal of battery B through wire 42, contacts 5, 4, multiplier 62 (if used), voltage responsive bus 60, winding 46, bus 58, contacts 7, 8 and connection 44 to the negative terminal of the battery; however, during the charging period the winding 46 is not energized sufficiently to open contacts 48 and therefore the cut-off relay C remains energized. The first pilot lamp 64 corresponding to battery B is illuminated since it is connected between contact 2 and bus 66.

When battery B reaches full charge, the winding 46 is sufficiently energized to open the TVR contacts 48, thereby de-energizing the cut-off relay C and opening the contacts 35, 36 and 37, 38 to disconnect the charging lines 28 and 30 from the busses 32 and 34. Furthermore, opening of contacts 35, 36 de-energizes the pilot lamp bus 66. The charge is thus cut off from battery B although the contact groups of switch S remain closed until the end of the timing interval.

At the end of the timing interval there is a short period of transfer in which the contacts of switch S are permitted to open before the contacts of switch S' are closed by the cam 110. During this transfer period, the control busses 58 and 60 are not connected with any battery, winding 46 is therefore de-energized and contacts 48 close. When the cam 110 operates on the contacts of switch S', the battery B' is connected to the charging busses 32 and 34 and also to the control busses 58 and 60 through which the TVR winding 46 is energized. Simultaneously, contact 103 closes on 102, thereby energizing relay C and establishing the connection between the charging lines and the charging busses through contacts 35 to 38. It will be noted that the winding 46 is connected to the battery before the charging connections are established. This sequence is important since the winding 46 would be energized by the high charger voltage if the voltage were not held down by previous connection to the battery.

The foregoing transfer has been described on the assumption that the TVR winding 46 has become sufficiently energized to open contacts 48 before the end of the timing interval. However, the transfer from B to B' is effected by the timer cams and will be accomplished even though the timer contacts 48 remain closed. The transfer takes place at the end of the timing interval regardless of the condition of the battery previously undergoing charge. This positive transfer under control of time prevents a low battery from robbing the other batteries of the system.

At the ends of the proper timing intervals, the charge is transferred to B², B³, etc., and finally back to B for the start of another cycle.

Any of the manual switches may be thrown at any time, in which case the charge will be applied to the battery corresponding to the first manual switch of the series in "up" position, and will continue on that battery regardless of the operation of any of the automatic devices. All connections subsequent to such first manual switch are inoperative; hence there is no possibility of paralleling two batteries. No charge adjusting resistors are shown in the leads from the manual switches to the batteries since it is assumed that the charge is to proceed as rapidly as possible in order that the system may be restored quickly to automatic control.

*Timing mechanism*

So far as the operation of the devices shown in Fig. 1 is concerned, the cams 10, 110, etc., may be simply mounted on a continuously rotating shaft. It is, however, desirable to effect the transfers with reasonable speed and to this end the mechanism shown in Figs. 2 and 3 is preferably used.

The cams are stacked on a shaft 68 and in the plane of each cam there is provided a switch assembly, only one of which is shown in Fig. 3. As herein illustrated, eleven cams are provided, one of which has a lobe 70 twice the length of the others. In a fire alarm system this long lobe is provided to give a double charge to the local battery which usually carries the greatest load.

The cam shaft 68 is advanced one-twelfth of a revolution every two hours. A quick advance is accomplished by a double Geneva motion. A continuously rotating shaft 72, preferably driven from an electric clock motor, is connected through suitable gearing 74 with a pin wheel 76 adapted to advance the star wheel 78 of the first Geneva motion every two hours. The star wheel carries a pin 80 co-operating with a star wheel 82, which constitutes the second Geneva motion. By this means the wheel 82 is advanced one step every two hours and makes a complete revolution every twenty-four hours. The star wheel 82 is mounted on the cam shaft 68. During a charging period the cam follower of the active switch rides on the middle of its cam lobe. At approximately the middle of the transfer period the previously active switch falls off its cam lobe and immediately thereafter the next switch of the series has its contacts closed by the next cam. In the case of the long lobe 70, the first advance, of course, makes no change in the electrical connections.

*System of Fig. 4*

The system shown in Fig. 4 is similar to that of Fig. 1, but differs therefrom principally in that the automatic switches are controlled by relays. This is an advantageous feature because it does not require the charging current to pass through the timer contacts. The system also includes other features with respect to manual control.

The system is illustrated as applied to a system for charging a number of batteries, of which three are illustrated, namely B, B' and B². One of these batteries, namely B, which may be the local battery of a fire alarm system, is utilized to supply energy for operating the relays and its terminals and the connections thereto are indicated on the drawings by plus and minus signs in circles.

The system includes three manual switches M, M' and M² having contacts 12 to 17, 112 to 117, and 212 to 217 exactly similar to the correspondingly numbered contacts of Fig. 1. Also each switch is provided with normally closed contact pairs 18, 118, etc. There are also provided sets of automatic switch contacts controlled by relays R, R' and R². The contacts of these relays are identical in purpose and arrangement with contacts 4 to 9, 104 to 109, and 204 to 209, respectively of Fig. 1, and are identically numbered in Fig. 4.

The rectifier 20 connects with the movable contacts 13 and 16 of switch M by conductors 84 and 86, respectively, the former including a resistor 88 for a purpose to be later described. As in Fig. 1, contact 14 of manual switch M is connected by a wire 24 with contact 113 of M' and contact 17 is connected by a wire 25 with contact 116. Similarly, contacts 114 and 117 of M' are connected with 213 and 216 of M² and so on for any other batteries that may be included in the system, exactly as in Fig. 1. Contacts 12 and 15 are connected by wires 21 and 22, respectively, with the positive and negative terminals of battery B, and the corresponding contacts of the other manual switches are connected to their respective battery terminals.

The connections for the automatic contacts differ from those of Fig. 1 in that these are directly associated with the corresponding contacts of the manual switches. Thus, contact 5 is connected by a wire 90 with the lead 21 and contact 8 is connected by wire 92 with the lead 22. Contact 6 is connected to the wire 24 through a charge adjusting resistor 40, and contact 9 is connected to the wire 25. Corresponding contacts of the other relays are similarly connected. It will be seen that the operation of the manual switches is the same as in Fig. 1, in that when all manual switches are in the down position they are ineffective and control is under the automatic devices, while if any manual switches are up, the first one of the series applies charging current to its battery. This arrangement of the manual and automatic switches is preferable to that of Fig. 1 because it allows an extension of the system by attachment of equipment to the busses, and without the necessity of breaking into previously established connections.

Contacts 4, 104, etc., are connected to a control bus 60 and contacts 7, 107, etc., are connected to a control bus 58, these busses leading direct to the TVR winding 46 as in Fig. 1. Contacts 104 and 204 are here illustrated as being connected to the control bus 60 through multiplier resistors 52 for the purpose previously described.

The timer cams 10, 110 and 210 are mounted on the shaft 68 which is preferably driven by the double Geneva motion of Fig. 2, and the cams are cut in the same manner as for the system previously described. The cam 10 controls a pair of normally open contacts 94, 95 and a pair of normally closed contacts 97. When these contacts are operated by the cam lobe, 94 closes on 95 and 97 opens away from 96; this is the position shown in Fig. 4 while charge is being applied to the battery B. The contacts controlled by cams 110 and 210 are numbered 194, etc., and 294, etc., respectively.

A cut-off relay CR is provided, having two sets of contacts 120, 121 and 122, 123. One terminal of the relay winding is connected to its own contact 120 and the other terminal is connected to a negative bus 124 which leads to the negative terminal of the local battery. This bus includes the contacts 18, etc., of the manual switches in series, whereby when any of such switches is in "up" position the automatic charge control is disabled, as will hereinafter be explained.

Contact 121 of the relay CR is connected by a wire 128 with the one of the contacts 48 of the TVR relay, the other contact 48 being connected to the positive terminal of the local battery.

Contact 120 of relay CR is connected to a bus 130 which includes a manual switch 132 for the purpose of cutting off automatic charging of all batteries except the first battery B. This bus is connected to the contacts 94, 194 and 294 of the timer switches. A circuit also leads from the positive terminal of the local battery through a wire 134 to contact 296, thence from contact 297 through a wire 136 to contact 196, thence from contact 197 through a wire 138 to contact 96. Contact 97 is directly connected to the bus 130.

Contacts 95, 195 and 295 are connected by wires 140, 142 and 144 with relay windings R, R' and $R^2$, respectively, each relay winding being also connected to the negative terminal of the local battery. Pilot lamps 146 are connected across the several relays.

Contacts 122 and 123 are connected across the resistor 88 by conductors 148 and 149, respectively. Under conditions of automatic charge control (relay CR being then energized) the resistor 88 is shunted, but when any manual switch is up so that the bus 124 is opened at 18 (or 118 or 218) the resistor 88 is in series with the battery undergoing charge. The resistor 88 is adjustable and the charging rate under manual control can therefore be varied.

As particularly illustrated in Fig. 4, charge is being supplied to the first battery B. Assuming that the battery has not been brought up to full charge, contacts 48 are closed because the winding 46 is not sufficiently energized to open them. Cut-off relay CR is held energized by a circuit from positive battery through contacts 48, wire 128, contacts 121, 120, winding CR and bus 124 to the negative battery terminal. Relay R is energized by a circuit traced from positive battery through contacts 48, wire 128, contacts 121, 120, bus 130, contacts 94, 95, wire 140 and winding R to the negative terminal. The corresponding pilot lamp is also illuminated. Contacts 4, 5, 6 and 7, 8, 9 are thus closed to connect battery B both to the charging circuit through 24, 25 and to the TVR relay winding through 58, 60.

If the battery comes up to voltage before the end of the timing interval, the TVR winding 46 is sufficiently energized to open contacts 48, thereby breaking the previously traced circuits for relays CR and R. Contacts 4 to 9 open so that first the control busses 58, 60 and the charging circuit are disconnected from the battery. Winding 46 is then de-energized allowing contacts 48 to close again, but such closure does not re-energize relay R because the cut-off relay contacts 120, 121 now remain open.

At the end of a timing interval the cams are advanced by the Geneva motion as previously described. From the position of Fig. 4 the first advance effects no transfer and the contact 94 will simply ride on a different part of the cam. The next succeeding advance, however, effects an actual transfer from B to B'. In the middle of the transfer period cam 10 drops its contacts before cam 110 lifts its contacts. The first effect is that contacts 94, 95 are opened and contacts 96, 97 are closed. Contacts 94, 95 are in the circuit of relay R; if relay R has been previously de-energized through operation of relay TVR, opening of 94, 95 is without effect, otherwise relay R is now de-energized and releases its contacts 4 to 9, thus disconnecting battery B from the TVR winding and from the charging circuit. Closure of 96, 97 establishes an energizing circuit for relay CR from the positive terminal of the local battery through 134, 296, 297, 136, 196, 197, 138, 96, 97, 130, winding CR and bus 124 to the negative terminal of the battery. Thus, relay CR is re-energized if it was de-energized in the preceding timing interval, and it is maintained continuously energized, notwithstanding momentary opening of contacts 48, if it was not de-energized in the preceding interval. In any case, the holding circuit for relay CR is established at contacts 48 before the transfer is completed.

The next step of the transfer is for cam 110 to close contacts 194, 195 and to open contacts 196, 197. The closure of contacts 194, 195 energizes the relay R' since the bus 130 has positive battery fed to it through contacts 48, connection 128, and contacts 120, 121. Energization of R' operates contacts 104 to 109 to connect the charger to battery B' and also to connect the battery to the TVR winding 46. Opening of contacts 196, 197 simply breaks the previously traced circuit through which the cut-off relay CR was energized, but the relay is now maintained energized through its holding circuit which includes the TVR contacts 48 and the contacts 120 and 121.

The charge proceeds on battery B' exactly as before until the timer calls for a transfer to $B^2$, and similarly to all batteries of the system.

The arrangement of the automatic switch contacts ending in numerals 4, 5, 6 and 7, 8, 9 is important. In Fig. 4 (and likewise in the system of Fig. 1), the middle contacts 5 and 8 are connected to the battery terminals, the movable contacts 6 and 9 are connected with the charging circuit and the upper contacts 4 and 7 are connected with the circuit of the voltage responsive relay TVR. In establishing connections the charging circuit is first connected to the battery and the battery is then connected to the relay winding, while in breaking connections the battery is first disconnected from the relay and then from the charging circuit. Therefore the voltage applied to the winding 46 is held down by the battery voltage, and there is no danger of false operation due to connection of the relay to the high charger voltage.

If at any time it is considered desirable to apply an extra charge to any battery of the system, this is easily done merely by operating the corresponding manual switch. Assuming, for example, that the extra charge is to be applied to battery B' while the automatic control is set for B, the switch M' is simply moved to its up position. This opens the negative bus 124 at 118 and thus de-energizes the relay R and also the cut-off relay CR, if these relays were previously energized. De-energization of the relay R opens contacts 4 to 9 and disconnects battery B from the charging circuit. Also, contact 113 closes on 112 and 116 on 115 of switch M', thereby connecting the charging lines to battery B'. The shunt is removed from resistor 88 by the opening of contacts 122, 123 and the charge on B' may then be adjusted by the resistor. It will be noted that while fixed charge adjusting resistors 40 may be included in the battery circuits for automatic control, such resistors are not included in the manual control circuits since it is considered desirable to adjust the charging rate manually through the resistor 88.

When any manual switch is up, the timer continues to operate but it is ineffective. Automatic control may be restored at any time by moving the manual switch to its down position. The manual control therefore detracts from the time which would otherwise be allotted to another battery under automatic control, and it is preferable to use the manual control only in the idle period after a battery undergoing an automatically controlled charge has come up to voltage and before the timing mechanism has indicated a transfer. Such idle periods are indicated on the panel by extinction of the pilot lights 146.

The manual switch 132 may be used to disable the automatic control for all batteries subsequent to the first. In a fire alarm system, it may be found that the trickle charge equipment which is usually employed, although not shown herein, may be sufficient to maintain the line circuit batteries in proper condition for long periods, but that daily high-rate charges are necessary for the local battery B. To avoid the drain on battery B necessary to operate the relays R, R', etc., the switch 132 may be opened. This switch is included in the connection 130 between contacts 94 and 194. When open it prevents energizing current being supplied to the relays R', R², etc. The timed automatic control continues to operate with respect to the local battery B.

*Conclusion*

The systems described herein are particularly adapted for charge control of batteries on fire alarm and similar systems. The control operates to maintain maximum effectiveness of the batteries with little or no necessity for supervision, while still affording the flexibility of manual control under special circumstances.

Although the preferred embodiments of the invention have been herein illustrated and described, it will be understood that the invention is not limited to these particular embodiments, but may be varied within the scope of the appended claims.

Having thus described the invention, I claim:

1. A battery charge control system comprising a charging circuit, a plurality of individual battery circuits, automatic switching devices for transferring the charging circuit to the several battery circuits, state-of-charge responsive means to disconnect a battery circuit from the charging circuit, time controlled means for operating the automatic switching devices in sequence, and manually controlled means for rendering the automatic devices ineffective and for connecting the charging circuit with a selected battery circuit.

2. A battery charge control system comprising a charging circuit, a plurality of individual battery circuits, an automatic switching device associated with each battery circuit, time controlled means for operating the automatic switching devices in sequence, a state-of-charge responsive relay, each automatic switching device having contacts to connect its corresponding battery circuit with the charging circuit and contacts to connect its battery circuit to the state-of-charge responsive relay, and cut-off means operated by the state-of-charge responsive relay to disconnect the circuit of a battery undergoing charge from the charging circuit, each automatic switching device having provision for disconnecting its battery circuit from the charging circuit and from the state-of-charge responsive relay prior to operation of the next succeeding switching device.

3. A battery charge control system comprising a charging circuit, a plurality of individual battery circuits, an automatic switching device associated with each battery circuit, time controlled means for operating the automatic switching devices in sequence, a voltage responsive relay, each automatic switching device having contacts to connect its corresponding battery circuit with the charging circuit and contacts to connect its battery circuit to the voltage responsive relay, cut-off means operated by the voltage responsive relay to disconnect the circuit of a battery undergoing charge from the charging circuit, each automatic switching device having provision for disconnecting its battery circuit from the charging circuit and from the voltage responsive relay prior to operation of the next succeeding switching device, and a manually controlled switching device for each battery circuit to render the automatic devices ineffective and to connect its corresponding battery circuit with the charging circuit.

4. A battery charge control system comprising a charging circuit, a plurality of individual battery circuits, an automatic switching device for each battery circuit, each device having contacts for connecting its battery circuit with the charging circuit, a set of cams for operating the switching devices in sequence and arranged to disconnect all batteries from the charging circuit during a transfer interval, and time controlled means for advancing the cams.

5. A battery charge control system comprising a charging circuit, a plurality of individual battery circuits, a state-of-charge responsive device, automatic switching means including a set of three contacts for each battery circuit, one of said contacts being connected with the charging circuit, one with the corresponding battery circuit and one with the state-of-charge responsive device, timing means effective to operate the several sets of contacts in sequence, and means operated by the state-of-charge responsive relay to open previously closed contacts of any battery upon completion of the charge.

6. A battery charge control system comprising a charging circuit, a plurality of individual battery circuits, a voltage responsive device, a relay for each battery circuit having contacts for connecting its battery circuit with the charging circuit and with the voltage responsive device, a cut-off relay to control energization of the battery circuit relays, a time controlled switch for each battery circuit relay and having contacts in series with its corresponding battery circuit relay, the several time controlled switches having series connected contacts to control energization of the cut-off relay, and means for operating the time controlled switches in sequence.

7. A battery charge control system comprising a charging circuit, a plurality of individual battery circuits, a voltage responsive device, a relay for each battery circuit having contacts for connecting its battery circuit with the charging circuit and with the voltage responsive device, a cut-off relay to control energization of the battery circuit relays, a time controlled switch for each battery circuit relay and having contacts in series with its corresponding battery circuit relay, the several time controlled switches having series connected contacts to control energization of the cut-off relay, and means for operating the time controlled switches in sequence, said means including a set of cams arranged in a transfer interval to close all of said series connected contacts and to open the contacts of all relays in series with their corresponding battery circuit relays.

8. In a transfer system, a timing control comprising a continuously rotating shaft, a cam shaft, and a double Geneva motion connecting the continuously rotating shaft with the cam shaft to maintain the latter stationary in timing intervals and to effect a rapid motion thereof in a transfer period.

9. In a transfer system, a timing control comprising a continuously rotating shaft, a first Geneva motion driven by the shaft, a second Geneva motion driven by the first, and a timing shaft maintained stationary in timing intervals and rapidly advanced in a transfer period.

10. A battery charge control system comprising a charging circuit, a plurality of individual battery circuits, a state-of-charge responsive device, a relay for each battery circuit having a set of three contacts, one of said contacts being connected with the charging circuit, one with the corresponding battery circuit and one with the state-of-charge responsive device, timing means normally effective to energize the several relays in sequence, and means operated by the state-of-charge responsive relay to open previously closed contacts of any battery upon completion of the charge.

11. A battery charge control system comprising a charging circuit, a plurality of individual battery circuits, a state-of-charge responsive device, a relay for each battery circuit having contacts for connecting its battery circuit with the charging circuit and with the state-of-charge responsive device, a cut-off relay to control energization of the battery circuit relays, a time controlled switch for each battery circuit relay and having contacts to energize its corresponding battery circuit relay under the control of the cut-off relay, the several time-controlled switches having contacts to control energization of the cut-off relay, and means for operating the time controlled switches in sequence.

12. A battery charge control system comprising a charging circuit, a plurality of individual battery circuits, a state-of-charge responsive device, a relay for each battery circuit having contacts for connecting its battery circuit with the charging circuit and with the state-of-charge responsive device, a cut-off relay to control energization of the battery circuit relays, a time controlled switch for each battery circuit relay and having contacts to energize its corresponding battery circuit relay under the control of the cut-off relay, the several time-controlled switches having contacts to control energization of the cut-off relay, means for operating the time controlled switches in sequence, and a holding circuit for the cut-off relay controlled by the state-of-charge responsive device.

13. In a battery charge control system, a charging line, a plurality of battery circuits, an automatic switch for each battery circuit including a contact connected with the charging line and a contact to be connected with a terminal of the corresponding battery, manual selector switching means including normally closed contacts in the charging line and individual selector contacts connected with the corresponding batteries, whereby the charging line may be connected with any selected battery regardless of the setting of the automatic switches.

14. In a battery charge control system, a charging line, a plurality of battery circuits, an automatic switch for each battery circuit including a contact connected with the charging line and a contact to be connected with a terminal of the corresponding battery, a manual selector switch associated with each automatic switch and having a pair of normally closed contacts in the charging line and additional contact means for connection of the charging line with its corresponding battery when said normally closed contacts are opened.

FOSTER E. WELD.